Figure 1:
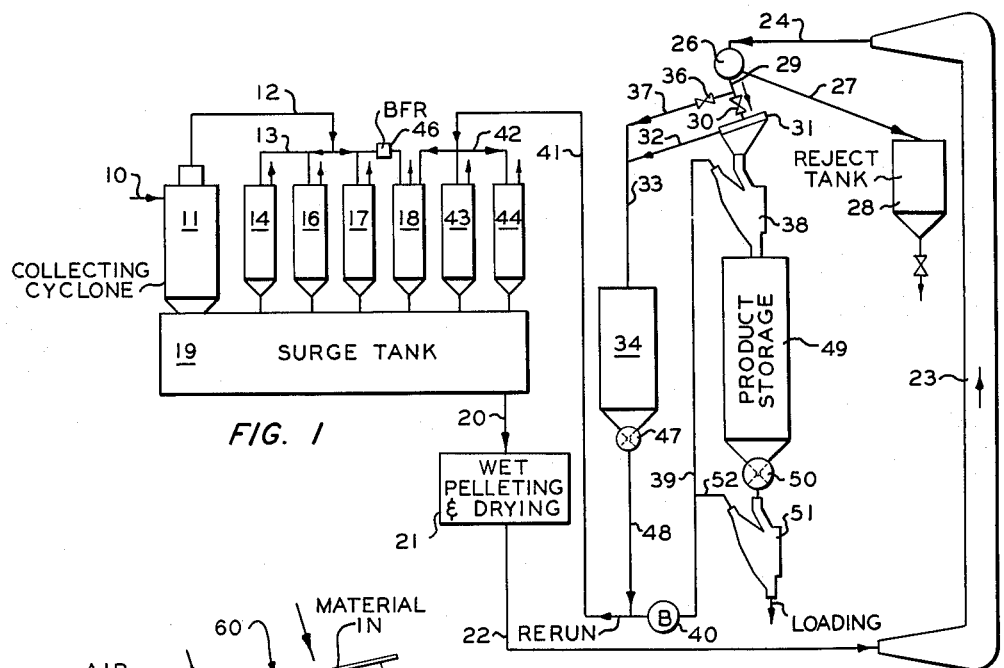

March 7, 1961 W. R. KING ET AL 2,973,863
CASCADING VANE DUST REMOVAL ELUTRIATOR
Filed June 23, 1958

INVENTORS
W. R. KING
FRED ROWE, JR
BY *Hudson & Young*
ATTORNEYS

United States Patent Office 2,973,863
Patented Mar. 7, 1961

2,973,863

CASCADING VANE DUST REMOVAL ELUTRIATOR

William R. King and Fred Rowe, Jr., Borger, Tex., assignors to Phillips Petroleum Company, a corporation of Delaware Filed June 23, 1958, Ser. No. 743,591

3 Claims. (Cl. 209—136)

This invention relates to an improved elutriator for removing fines from particulate solid material. In another aspect it relates to an improved dust removal apparatus for use in a system for handling carbon black pellets.

In the production of carbon black it is conventional to pelletize the black in order to facilitate handling without excessive loss to the atmosphere and to reduce the bulk of the product. Various pelleting methods can be used, such as tumbling loose flocculent black in a horizontally elongated cylindrical mill, or by admixing the black with water and agitating the mixture in a pug mill. In the latter process the pellets are generally dried to a moisture content of below about 1 weight percent. Conveying belts and bucket elevators are generally used to transfer pelletized carbon black to product storage in order to minimize the formation of fines. Even so, the problem of separating dust from the pelletized black exists and it is difficult to effect complete removal of carbon black dust from the pelletized product without recycling some of the product itself. Caking and plugging problems frequently exist in apparatus in which efficient dust removal from pelletized black is attempted.

According to our invention an improved elutriator is provided which enables efficient dust removal from carbon black pellets with a minimum of plugging and recycle of product. Our elutriator has a generally rectangular shell with a substantially vertical face carrying a plurality of evenly distributed air inlet ports. The rear panel of the shell slopes toward the lower edge of the face and terminates at a lower opening through which product falls from the elutriator. In a preferred form a hopper bottom is positioned at the lower opening of the shell to receive the elutriated product. A material feed distribution section is positioned at the top of the shell and a plurality of sloping baffles are located in substantially vertical alignment beneath the point of feed introduction, each baffle positioned slightly forward of the baffle above it so that the material flowing from the inlet to the outlet at the bottom of the shell must pass successively over each baffle. These baffles are spaced apart so that air entering through the ports in the face passes between the baffles and picks up dust from the product cascading from one baffle to another. An air suction section is positioned behind the feed inlet at the top of the shell so that air passing from the baffles leaves the shell without changing direction, thereby minimizing dust fallout. In the preferred embodiment of our invention rapping or vibrating means are attached to at least one and preferably both sides of the elutriator shell.

Figure 2:
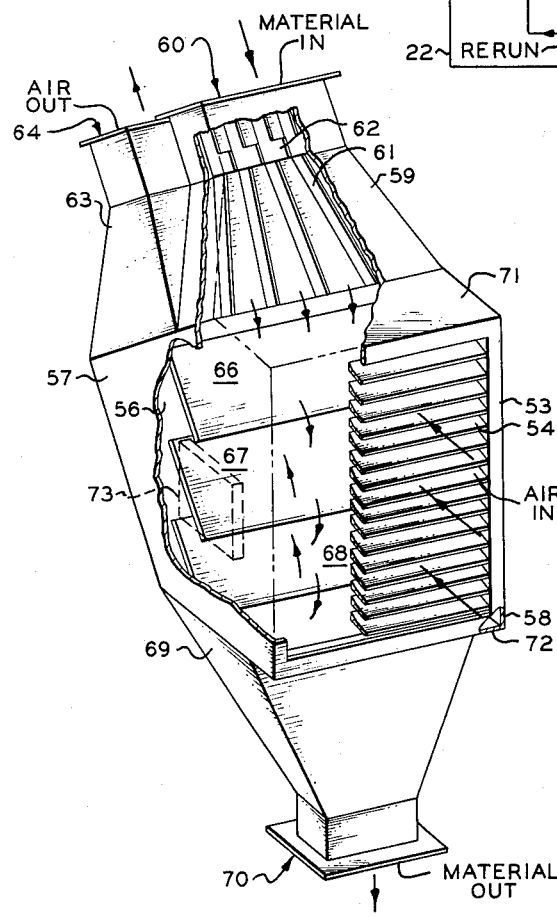

It is an object of our invention to provide an improved dust removal elutriator. Another object of our invention is to provide apparatus which will separate fines from carbon black pellets while removing a minimum of specification product with the fines. Another object is to provide an elutriator which enables effective dust removal of carbon black pellets while avoiding caking or plugging in the apparatus. Other objects, advantages and features of our invention will be apparent to those skilled in the art from the following discussion and drawings in which:

Figure 1 is a schematic flow diagram showing positions of use for our elutriator in a carbon black handling system; and Figure 2 is a cutaway isometric view of our elutriator in detail.

Various carbon black handling systems are known in the art and it is necessary in most to employ some type of dust removal apparatus before placing the pelletized carbon black in storage or before loading a pelletized product in drums or railroad cars for shipment. The fines thus recovered are recycled in the system and mixed with fresh flocculent black for pelletizing. One wet pelleting process and product handling system in which the elutriator of our invention can be employed is described in detail in the copending application of W. R. King, Serial No. 647,408, filed March 20, 1957.

Referring to the drawing, a carbon black handling system is illustrated schematically by Figure 1. In this figure, effluent line 10, from a series of carbon black furnaces, not shown, leads to cyclone collector 11. The exhaust gas line 12 from collector 11 connects with manifold 13 feeding bag filters 14, 16, 17 and 18. Carbon black from collector 11 and bag filters 14, 16, 17 and 18 is dropped into surge tank 19 and from there passes by line 20 through the wet pelleting and drying system 21. This wet pelleting and drying system comprises means for introducing and mixing water with the carbon black, a weighing system for the control of the carbon black-water ratio, and a series of pug mill densifiers from which the moist pellets pass to a gas-fired dryer. Dry pellets containing less than about 1 percent water are conveyed by belt 22 to bucket elevator 23.

From the bucket elevator the pellets pass on belt 24 to magnetic drum 26 in which iron and steel particles which may have fallen into the carbon black streams from the conveyors and other equipment are removed. Such foreign material is passed through line 27 to reject tank 28 for suitable disposal. The carbon black then passes through line 29 containing valve 30 and passes over screening device 31 which removes oversize material, passing such oversize material through lines 32 and 33 to rerun tank 34. Off specification product can also be passed to rerun tank 34 by closing valve 30 and opening valve 36 in line 37, thus routing the product through lines 37 and 33.

Carbon black product falls through screen device 31 into elutriator 38 which is the apparatus of our invention. Fines are removed through line 39 and are passed by blower 40 through line 41 to manifold 42 which connects to bag filters 18, 43 and 44. Back flow regulator 46 is provided in manifold 13 between filters 17 and 18 to prevent rerun product from entering the series of fresh product bag filters as described in the above-mentioned opening application. Black from rerun tank 34 can also be introduced through feeder 47 and line 48 into line 41 for return to surge tank 19 through bag filters 18, 43 and 44. Pelletized black from which the dust has thus been removed passes into product storage tank 49. From tank 49 the product is passed through feeder valve 50 into elutriator 51 before passing to loading operation for shipment. Fines recovered in this elutriation step pass through line 52 into line 39 and are recycled to the pelleting operation.

While the positions in the system shown in Figure 1 are those preferred for the placement of our elutriator, other positions are available and the most desirable location will depend upon the layout of the particular carbon black handling system in which the elutriators are used.

To describe in greater detail the elutriator of our invention reference is now made to Figure 2. Our elutriator comprises a generally rectangular shell made up of substantially flat and rectangular panels. The shell can be considered as being open at its top and bottom ends, having a rectangular face 53 which carries a plurality of louvers 54 across substantially its entire area. Preferably, the louvered portion of face 53 makes up all of the face but a relatively narrow frame at its periphery. The louvers 54 in face 53 slope upwardly and inwardly so that air passing through the louvers is directed toward the upper rear portion of the shell. The rear section of the shell is a rectangular sloping panel 56, opposite the face section and lying in an oblique plane which would intersect an extension of the face below such face. Preferably, the slope of the louvers in the face is approximately equal to or slightly less than the slope of rear panel 56. The shell is completed by two vertical side panels 57 and 58 which adjoin the face and rear panels at their opposite edges.

At the top of the shell a feed section 59 is positioned centrally and adjoining side panels 57 and 58. Feed section 59 has a rectangular cross section and is tapered from a width equal to that of the shell to a narrower rectangular opening 60. The interior of feed section 59 is divided into a plurality of longitudinal channels by distribution fins 61. Feed section 59 can lie along a substantially vertical plane but is preferably sloped similar to rear plate 56. In this way distribution fins 61 need not extend the full width of the feed section in order to effectively subdivide the stream of flowing carbon black and distribute the material evenly across the full width of the shell. Since these fins do not extend the full width of the feed section, the possibility of plugging is reduced when slugs of material enter the feed section. As shown in Figure 2, these fins are extended the full width of the feed section in very short portions 62 to reinforce the section and aid in subdividing the streams of carbon black.

Positioned immediately behind the face section is a suction section 63 which likewise has a rectangular cross section and adjoins side panels 57 and 58 and rear panel 56. Suction section 63 tapers upwardly in two dimensions from the full width of the shell to a substantially narrower outlet 64. Preferably, the suction section 63 has an axis of symmetry which lies in a plane parallel to rear panel 56.

Within the shell three rectangular baffle plates are positioned from top to bottom in near vertical alignment below feed section. These baffle plates are spaced equally apart and lie in planes parallel to rear panel 56. The upper baffle 66 lies immediately below feed section 59 and is positioned to receive material falling from feed section 59 as indicated by the arrows. The middle baffle 67 is positioned below and slightly forward of baffle 66 and the lower baffle 68 is positioned below and slightly forward of baffle 67 so that material passing from top to bottom of the shell must pass successively over each of the three baffle plates. As the material falls from one baffle to the other, air passes through the material and between the baffle plates and leaves through suction section 63 and outlet 64.

A hopper bottom 69 is positioned at the bottom of the shell and adjoins side panels 57 and 58 and back panel 56. Material falling from baffle 68 enters the top of hopper 69 and passes from the elutriator through outlet 70. The shell is enclosed by panel 71 at the top of the shell between face 53 and feed section 59 and by a panel 72 at the bottom of the shell between face 53 and hopper 69. Other panels can be added as needed in order to enclose the shell at all points except those specifically described, i.e., the louvered air inlet, the material feed section, the air suction section and the material oulet at the bottom of the hopper.

Vibrators or the rappers operated electrically or pneumatically are positioned in the center portion of each side panel. A vibrator 73 is indicated in Figure 2 on the center of panel 57. Vibration thus provided reduces considerably the tendency toward plugging and helps hold down scale formation. The rectangular configuration of the elutriator enables a flexible side panel to be employed, thereby increasing the effectivenesses of the rapper.

The elutriator of our invention is unique in that it enables complete and effective contact of the elutriation air with the descending product. Distributing the product across the full width of the elutriator and providing a face section which has air inlets spaced evenly across substantially the full area of the face section ensures direct and adequate supply of air between the baffle plates. The sloping rear section enables a high air velocity to be employed without the disadvantage of withdrawing pelletized black with the fines. Heavy particles which are carried with the fines over the rear edge of the baffle plates fall out and are passed down to the hopper by the sloping rear panel. Our elutriator also presents an advantage in its air flow path which does not change direction between the baffle plates and the air outlet. In this manner dust fallout is minimized.

While the size of our elutriator is quite flexible, depending upon the use to which it it to be put, it is not necessarily large in order to be quite effective. For example, an elutriator proportioned as shown in Figure 2 and having a face section approximately 3 feet high and 30 inches wide is capable of handling approximately 2000 pounds of pelletized carbon black per hour quite easily with an inlet air velocity of about 2.7 cubic feet per second. Carbon black pellets generally have a size of about $\frac{1}{64}$ to $\frac{1}{32}$ of an inch in diameter and may be as large as $\frac{1}{8}$ inch in diameter in certain instances. The percentage of fines in the product can vary considerably and from 1 to 4 percent fines can be removed effectively with an elutriator above described.

As will be evident to those skilled in the art, various modifications of this invention can be made, or followed, in the light of the foregoing disclosure and discussion, without departing from the spirit or scope thereof.

We claim:

1. In a pelletized carbon black handling system, improved means for separating carbon black fines from pellets comprising a shell having an open top and bottom, a rectangular fully louvered face lying in a vertical plane, a rectangular sloping rear panel opposite said face and lying in an oblique plane intersecting said vertical plane below said face, and two vertical side panels adjoining opposite edges of said face and rear panel to complete said shell; a feed section positioned centrally above said shell and adjoining said side panels, said feed section having rectangular cross section and tapering upwardly from a width equal to that of said shell to a substantially narrower inlet opening; a plurality of distribution fins positioned longitudinally in said feed section, extending less than the full width of said section and dividing same into a plurality of substantially equal longitudinal channels; a suction section having rectangular cross section, positioned above said shell, behind said feed section and adjoining said side panels and rear panel, said suction section tapering upwardly in two dimensions to an outlet opening and having an axis of symmetry lying in a plane parallel to said oblique plane; three rectangular baffle plates distributed from top to bottom within said shell in near vertical alignment below said feed section and equally spaced apart in planes parallel to said oblique plane, the middle baffle positioned generally forward of the upper baffle but rearwardly of the depending edge thereof and the lower baffle positioned generally forward of the middle baffle but rearwardly of the depending edge thereof so that material falling from top to bottom of said shell from said feed section must pass successively over each baffle;

a hopper bottom adjoining the lower edge of said rear panel and side panels and disposed to receive material from said lower baffle, panel means closing the top and bottom of said shell between said face, hopper, feed and suction sections; and vibrating means attached to the center portion of each side panel.

2. Carbon black separating means according to claim 1 wherein said face is louvered in substantially its entirety and each louver is pitched inwardly and upwardly in planes parallel to each other and substantially parallel to said oblique plane.

3. Carbon black separating means according to claim 1 wherein said oblique plane forms a 25 to 45 degree angle with said vertical plane.

References Cited in the file of this patent

UNITED STATES PATENTS

| | | |
|---|---|---|
| 33,231 | Beach | Sept. 10, 1861 |
| 1,085,922 | Lakey | Feb. 3, 1914 |
| 1,903,046 | Hunter | Mar. 28, 1933 |
| 2,777,576 | Stevenson | Jan. 15, 1957 |

OTHER REFERENCES

"Denver Equipment Company Handbook," 1954; pages 214–215.